US008077839B2

(12) United States Patent
Yasko

(10) Patent No.: US 8,077,839 B2
(45) Date of Patent: Dec. 13, 2011

(54) HANDHELD DEVICE FOR DIALING OF PHONE NUMBERS EXTRACTED FROM A VOICEMAIL

(75) Inventor: Christopher C. Yasko, Alpharetta, GA (US)

(73) Assignee: Freescale Semiconductor, Inc., Austin, TX (US)

( * ) Notice: Subject to any disclaimer, the term of this patent is extended or adjusted under 35 U.S.C. 154(b) by 1229 days.

(21) Appl. No.: 11/621,487

(22) Filed: Jan. 9, 2007

(65) Prior Publication Data
US 2008/0165938 A1 Jul. 10, 2008

(51) Int. Cl.
*H04M 11/00* (2006.01)
(52) U.S. Cl. .................... 379/88.16; 379/88.23; 455/413
(58) Field of Classification Search ................. 379/67.1, 379/68, 88.16, 88.22, 88.23, 88.24, 88.25, 379/88.26, 88.19, 210.01; 455/413, 412.1, 455/414.1, 415
See application file for complete search history.

(56) References Cited

U.S. PATENT DOCUMENTS

| 5,651,056 A * | 7/1997 | Eting et al. ................. 379/88.01 |
| 5,742,736 A * | 4/1998 | Haddock ....................... 704/270 |
| 5,857,013 A | 1/1999 | Yue et al. |
| 6,219,407 B1 * | 4/2001 | Kanevsky et al. ......... 379/88.02 |
| 6,249,765 B1 * | 6/2001 | Adler et al. .................... 704/500 |
| 6,259,657 B1 * | 7/2001 | Swinney ....................... 704/270 |
| 6,507,643 B1 | 1/2003 | Groner |
| 6,526,128 B1 * | 2/2003 | Kermani .................... 379/88.22 |
| 6,587,871 B1 | 7/2003 | Schrader |
| 6,590,965 B1 | 7/2003 | Poole et al. |
| 6,601,031 B1 | 7/2003 | O'Brien |
| 6,639,972 B1 | 10/2003 | Cannon et al. |
| 6,775,651 B1 | 8/2004 | Lewis et al. |
| 6,788,767 B2 * | 9/2004 | Lambke ...................... 379/88.01 |
| 7,251,313 B1 * | 7/2007 | Miller et al. ............... 379/88.01 |
| 7,288,712 B2 | 10/2007 | Uehara |
| 7,453,991 B1 * | 11/2008 | Hirschberg et al. ............. 379/68 |
| 7,535,381 B2 | 5/2009 | Marsh et al. |
| 7,564,956 B2 * | 7/2009 | Holtzberg .................. 379/88.25 |
| 2002/0107695 A1 * | 8/2002 | Roth et al. ..................... 704/275 |
| 2002/0110226 A1 * | 8/2002 | Kovales et al. ............ 379/88.17 |
| 2002/0196910 A1 * | 12/2002 | Horvath et al. ............ 379/88.01 |
| 2003/0063717 A1 * | 4/2003 | Holmes ...................... 379/88.04 |
| 2005/0177372 A1 | 8/2005 | Wang et al. |
| 2005/0233730 A1 * | 10/2005 | Snyder ....................... 455/412.1 |

(Continued)

OTHER PUBLICATIONS

Non-final Office Action dated Feb. 28, 2011 in U.S. Appl. No. 12/203,480.
Non-final Office Action dated Jul. 14, 2011 in U.S. Appl. No. 12/203,480.

*Primary Examiner* — Olisa Anwah
(74) *Attorney, Agent, or Firm* — James L. Clingan, Jr.

(57) ABSTRACT

A method for processing a telephone number embedded in a voicemail received by a user of the handheld device comprising a processor and a memory is provided. The method includes playing back the voicemail. The method further includes in response to receiving a first marker set by the user to indicate a start of a telephone number, initiating storage of an audio sample corresponding to the telephone number in the memory. The method further includes terminating storage of the audio sample corresponding to the telephone number in the memory either automatically or in response to receiving a second marker set by the user to indicate an end of the telephone number. The method further includes using the processor, processing the stored audio sample to extract digits corresponding to the telephone number and communicating the extracted digits to an application executing on the processor.

17 Claims, 3 Drawing Sheets

U.S. PATENT DOCUMENTS

2006/0166650 A1     7/2006  Berger et al.
2007/0081661 A1*    4/2007  Korah et al. ............. 379/355.01
2008/0188204 A1*    8/2008  Gavner ........................ 455/413
2008/0226041 A1*    9/2008  Ramamoorthy et al. .. 379/88.01
2009/0275316 A1*   11/2009  Springer ...................... 455/415

* cited by examiner

HANDHELD DEVICE FOR DIALING OF PHONE NUMBERS EXTRACTED FROM A VOICEMAIL

BACKGROUND

1. Field

This disclosure relates generally to handheld devices, and more specifically, to a handheld device for dialing of phone numbers extracted from a voicemail.

2. Related Art

Often when a user receives a phone call on a handheld device and is unable to respond right away, the caller may leave a voicemail. As part of the voicemail, the caller may leave a call back number, such as her mobile phone number or office telephone number. The user of the handheld device would then typically play the voicemail back and while listening to the voicemail being played write down the relevant parts of the message and the call back number left by the caller. While in most instances the process of writing down the call back number does not pose a problem, it is difficult to do so in other instances. For example, the user of the handheld device may not be able to write down the call back number while driving or engaging in any other activity that prevents the user from writing down the call back number.

Accordingly, there is a need for a handheld device for dialing phone numbers extracted from a voicemail.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a method for processing a telephone number embedded in a voicemail received by a user of the handheld device comprising a processor and a memory is provided. The method includes playing back the voicemail. The method further includes in response to receiving a first marker set by the user to indicate a start of a telephone number, initiating storage of an audio sample corresponding to the telephone number in the memory. The method further includes terminating storage of the audio sample corresponding to the telephone number in the memory either automatically or in response to receiving a second marker set by the user to indicate an end of the telephone number. The method further includes, using the processor, processing the stored audio sample to extract digits corresponding to the telephone number and communicating the extracted digits to an application executing on the processor.

In another aspect, a method for processing a telephone number embedded in a voicemail received by a user of the handheld device comprising a processor and a memory is provided. The method includes playing back the voicemail. The method further includes in response to receiving a first marker set by the user to indicate a start of a telephone number, initiating storage of an audio sample corresponding to the telephone number in the memory. The method further includes terminating storage of the audio sample corresponding to the telephone number in the memory either automatically or in response to receiving a second marker set by the user to indicate an end of the telephone number. The method further includes, using the processor, processing the stored audio sample to extract digits corresponding to the telephone number. The method further includes determining a quality score corresponding to the extracted digits. The method further includes if the quality score corresponding to the extracted digits is within a predetermined range, then comparing the extracted digits to at least one of a set of locally stored telephone numbers and a set of network-stored telephone numbers to generate higher-confidence digits and communicating the higher-confidence digits to an application executing on the processor.

In yet another embodiment, a handheld device for dialing a telephone number is provided. The handheld device includes a memory for storing (1) instructions for playing back a voicemail received by the user of the handheld device; and (2) instructions for in response to receiving a first marker set by the user to indicate a start of a telephone number, initiating real-time processing of an audio sample corresponding to the telephone number. The handheld device further includes a processor for processing the audio sample to extract digits corresponding to the telephone number and communicating the extracted digits to an application executing on the processor.

Figure 1:
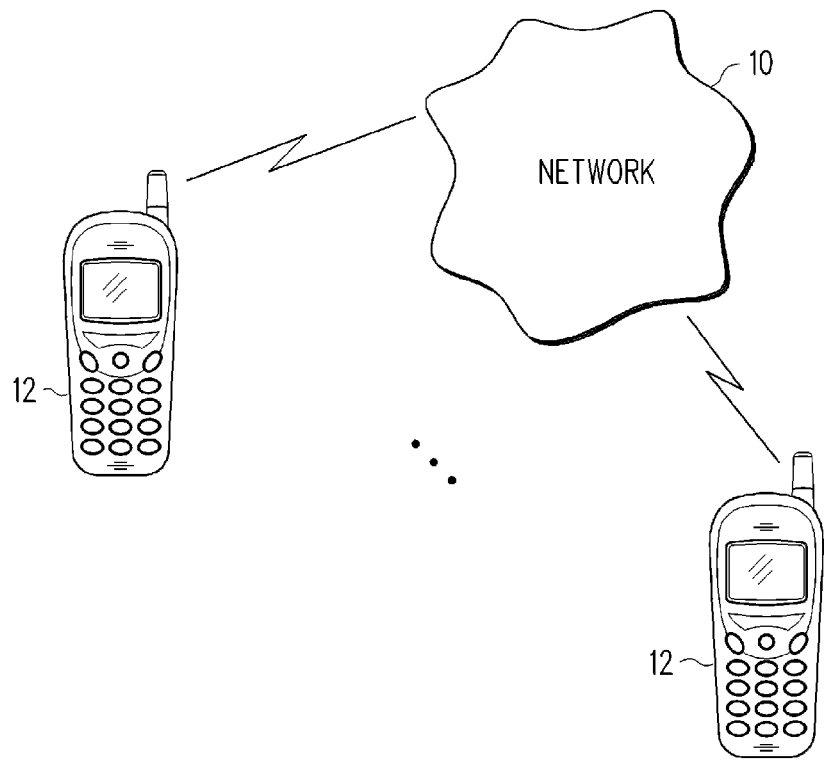
FIG. 1 shows an exemplary diagram of a system environment, consistent with embodiments of the invention.

FIG. 1 shows an exemplary diagram of a system environment, consistent with embodiments of the invention. Various handheld devices, such as 12 may be interconnected via network 10. By way of example, network 10 may be a communications network capable of facilitating communication between handheld devices 12. Network 10 may be a wireless network or a combination of wireless and wired networks. Network 10 may include components, such as switching stations and base stations to enable wireless communication between handheld devices 12 and 14. Network components may include hardware and software modules to enable user applications, such as voicemail, data streaming, video streaming, text messaging, and/or other applications.

Figure 2:
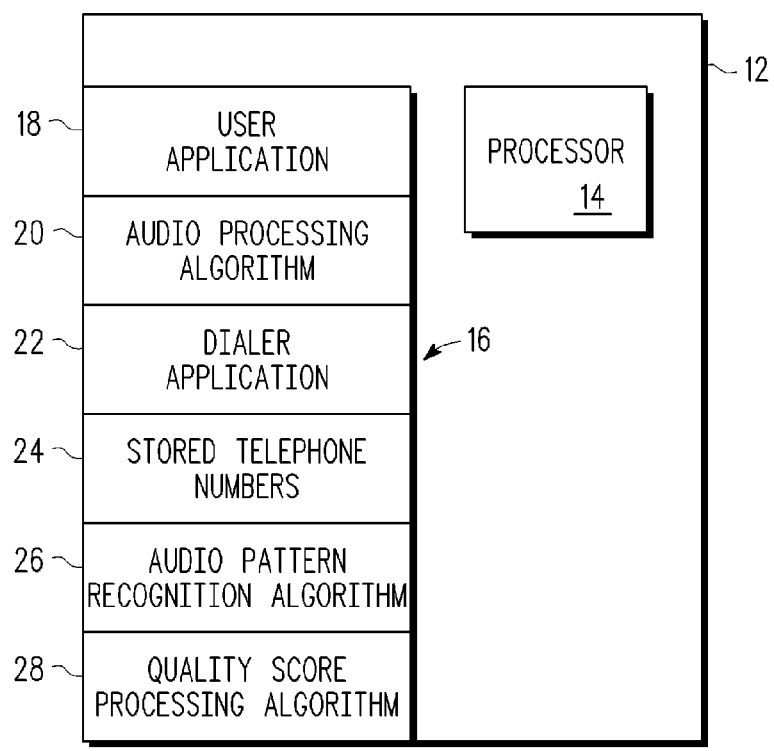
FIG. 2 shows exemplary components of a handheld device, consistent with embodiments of the invention.

FIG. 2 shows exemplary components of handheld device 12, consistent with embodiments of the invention. Handheld device 12 may be a mobile phone, a PDA, or any other handheld device capable of communicating with network 10. Moreover, handheld device 12 may not be strictly a device held by a user, but could be worn by the user. By way of example, handheld device may include a processor 14 and memory 16. Memory 16 may include various software modules and data to provide different functions associated with handheld device 12. For example, memory 16 may include user application 18, audio processing algorithm 20, dialer application 22, stored telephone numbers 24, audio pattern recognition algorithm 26, and quality score processing algorithm 28. User application 18 may provide a user interface for handheld device 12, such that the user of handheld device 12 may interact with the device. Audio processing algorithm 20 may process audio samples to extract digits corresponding to a telephone number, for example. Dialer application 22 may dial a telephone number. Stored telephone numbers 24 may include telephone numbers stored in memory 16, as part of the user's address book, for example, or on a removable memory SIM card, for example. Audio pattern recognition algorithm 26 may perform matching of extracted digits with stored values. Quality score processing algorithm 28 may determine a quality score corresponding to the extracted digits, for example. Although FIG. 2 shows separate software modules for providing various functions, these modules may be combined or distributed in any manner. Moreover, although FIG. 2 shows only one processor and one memory, handheld device 12 may include other processors and memories. In addition, handheld device 12 may include other hardware, such as a base-band processor, a radio frequency module, an audio processor, and/or a video processor. Furthermore, although FIG. 2 shows specific software modules, there may be additional or fewer software modules. In addition, the functionality of these modules may be combined or distributed in any manner.

Figure 3:
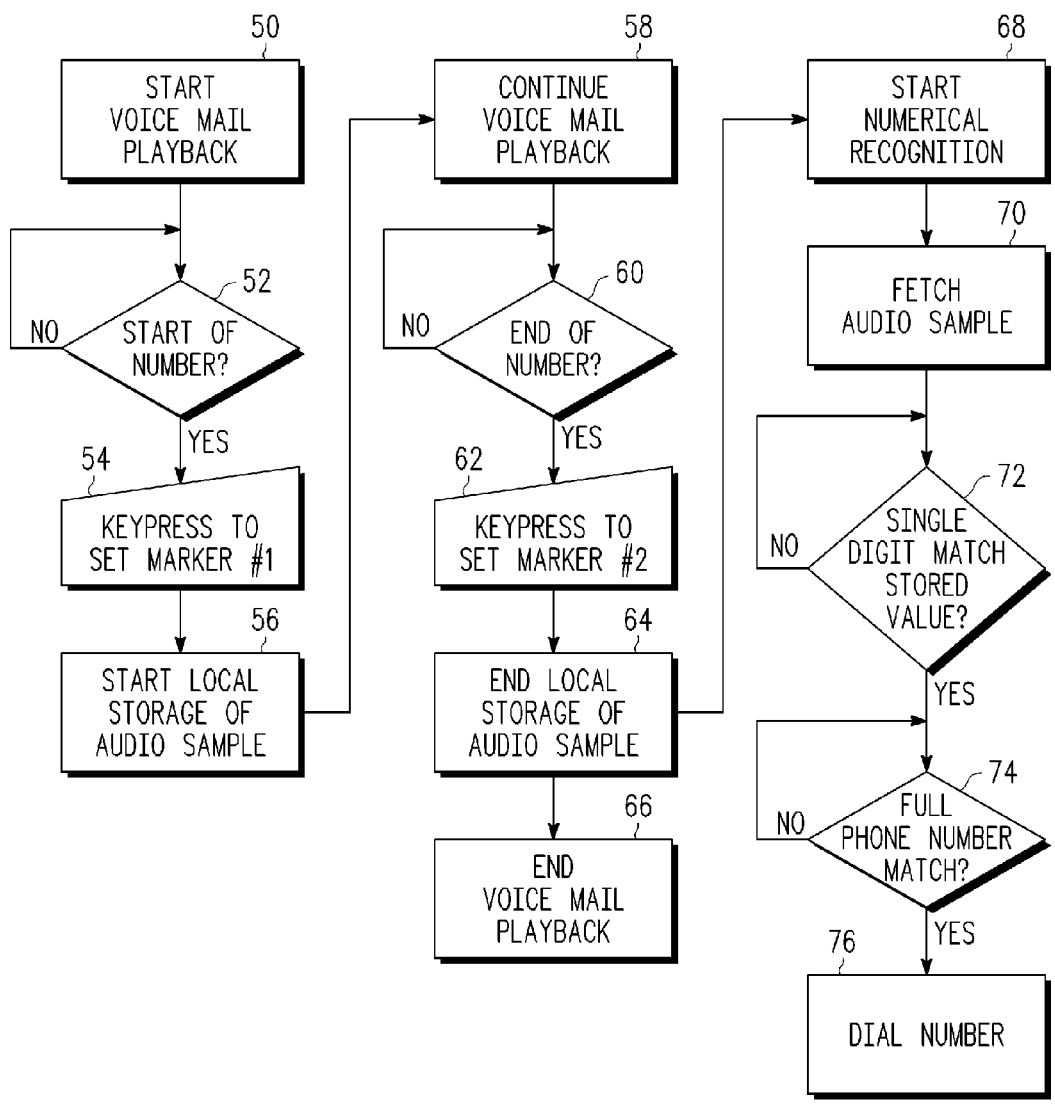
FIG. 3 shows a flowchart for an exemplary method for dialing a telephone number, consistent with embodiments of the invention.

FIG. 3 shows a flowchart for an exemplary method for dialing a telephone number, consistent with embodiments of the invention. A handheld device may process a telephone number embedded in a voicemail received by a user of the handheld device. The handheld device may start playing back the voicemail (step 50). As used herein the term "voicemail" includes a locally stored message, a streamed audio stream containing the message, or any real-time streamed message. Moreover, the term "playing" includes processing the voicemail, such that the user of the handheld device can hear the content of the voicemail. This step may be performed in response to a user input consistent with traditional methods of accessing voicemail. As the voicemail is played back, the user waits for a start of the telephone number (step 52). The telephone number left by the caller may be a mobile phone number, an office phone number, or a home phone number for example, in a traditional 10 digit format (321) 321-4321, or international format (+12) 34 56 78 90, or in an other example in an Internet SIP format 123.123.123.123. Indeed, no telephone number may have been left by the caller. In that instance, other conventional techniques may be used to dial the caller's number.

In response to receiving a first marker set by the user to indicate a start of a telephone number, processor 14 may initiate storage of an audio sample corresponding to the telephone number in memory 16. Audio processing algorithm 20, when executed by processor 14, may perform this step. By way of example, as shown in FIG. 3, the user of handheld device 12 may press a key of handheld device 12. This keypress would result in setting of marker #1 (step 54). For example, the played back voicemail may state: "This is John; I'm at work so call me back at 789-123-4567 later today." The user may press the key as soon as the user hears the word at, just prior to the start of the telephone number. In response to which local storage of an audio sample would be started by processor 14 of handheld device 12 (step 56). Processor 14 will continue playing back the voicemail (58) until the end of the telephone number is reached (step 60). The user of the handheld device would be listening to the played back voicemail and would be able to tell when the end of the telephone number has been reached.

The method further includes, in response to receiving a second marker set by the user to indicate an end of the telephone number, terminating storage of the audio sample corresponding to the telephone number in the memory. Audio processing algorithm 20, when executed by processor 14, may perform this step. By way of example, as shown in FIG. 3, the user of handheld device 12 may press a key of handheld device 12. This keypress would result in setting of marker #2 (step 62). With reference to the earlier example of the voicemail above, the user may press the key as soon as the user hears the last digit of the played back telephone number. In response to which local storage of an audio sample would be ended by processor 14 of handheld device 12 (step 64). Processor 14 will end voicemail playback (step 66) once the voicemail is played to completion or the user interrupts the playback. Although FIG. 3 specifically shows the setting of marker #2 by the user, the user may not need to set marker #2. In that case, after an elapse of a predetermined time, local storage of the audio sample may be terminated by processor 14. Alternatively, processor 14 may determine an ending of recorded telephone number and terminate local storage of the audio sample. Thus, for example, audio processing algorithm 20 when executed by processor 14 may perform this step automatically without any user action.

The stored audio sample may be processed to extract digits corresponding to the telephone number. Audio pattern recognition algorithm 26, when executed by processor 14, may perform this step. For example, as shown in FIG. 3, audio pattern recognition algorithm 26 may start numerical recognition (step 68). Numerical algorithm processing algorithm 26 may be a voice recognition program that is tuned to match voice prints. To improve performance of audio pattern recognition algorithm 26, a user may train the algorithm to recognize ten digits: 0, 1, 2, 3, 4, 5, 6, 7, 8, and 9, when spoken by the user. Values generated as part of training may be stored in memory 14 of handheld device 12. As part of this process, audio pattern recognition algorithm 26 may fetch audio sample (step 70) and extract digits from it. Audio pattern recognition algorithm 26 may determine whether a single digit (for example, the first digit) matches a stored value (step 72). Audio pattern recognition algorithm 26 may compare a subset of the audio sample (for example, a single digit) to each of the possible stored digits (for example, the digits 1, 2, 3, 4, 5, 6, 7, 8, and 9) and determine a pattern match. Audio pattern recognition algorithm 26 may include repetitive, or recursive steps, to process a single digit. Audio pattern recognition algorithm 26 may include repetitive, or recursive steps, to process each subsequent digit in the stored sample Audio pattern recognition algorithm 26 may determine whether the full phone number matches (step 74) and if so then pass the full phone number to dialer application 22, which may dial the phone number (step 76). Additionally and/or alternatively, audio pattern recognition algorithm 26 may also pass the full phone number to user application 18, which may display the full phone number to the user of handheld device 12. The user may even be prompted to provide user input to determine whether the phone number should be dialed or not.

Figure 4:
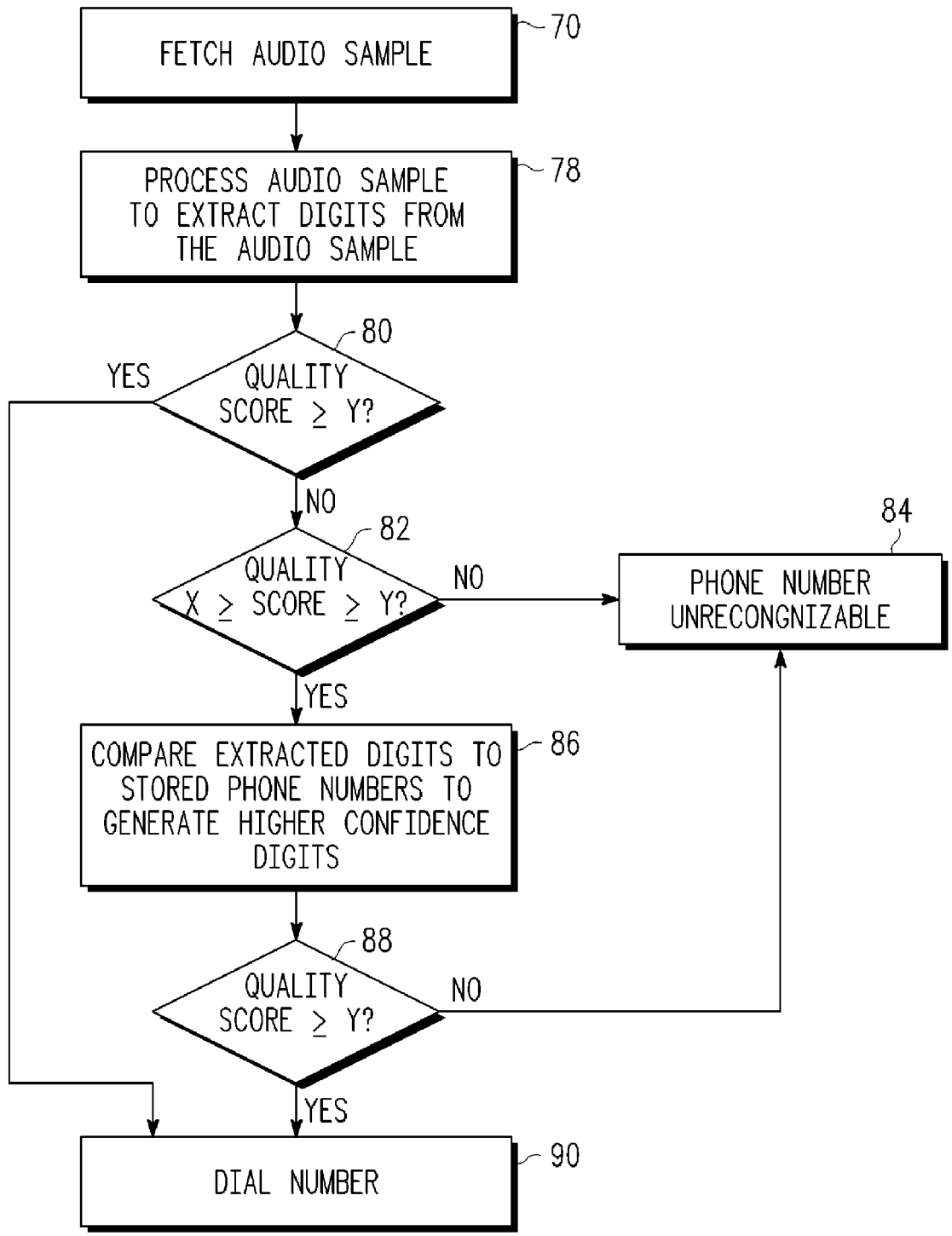
FIG. 4 shows another flowchart for another exemplary method for dialing a telephone number, consistent with embodiments of the invention.

FIG. 4 shows another flowchart for another exemplary method for dialing a telephone number, consistent with embodiments of the invention. As part of this step an audio sample corresponding to a telephone number may be fetched (step 70). As explained above, with reference to FIG. 3, the stored audio sample may correspond to audio between the two markers set by the user of handheld device 12. The method further includes processing the audio sample to extract digits corresponding to the telephone number (step 78). Next, quality score processing algorithm 28 may process the extracted digits to determine a quality score corresponding to the extracted digits. Audio pattern recognition algorithm 26 may additionally utilize a quality score processing algorithm 28 to determine the best fit for each, or all, possible digit matches. Quality score processing algorithm 28 may calculate a score based on a pattern match for each individual digit, including a set of stored ideal digits, or a set of trained digits. Additionally, the quality score processing algorithm 28 may determine each, or all, digits meet a minimum quality score threshold. If all digits exceed a predetermined minimum quality score threshold, the audio pattern recognition algorithm 26 is terminated successfully with confidence. If all digits, or any digit, fall below a predetermined quality score threshold, the audio pattern recognition algorithm 26 may terminate unsuccessfully.

The method further includes, if the quality score corresponding to the extracted digits is within a predetermined range, for example, above a minimum threshold but below a maximum threshold then comparing the extracted digits to at least one of a set of locally stored telephone numbers and a set of network-stored telephone numbers to generate higher-confidence digits and communicating the higher-confidence digits to an application executing on the processor. Referring still to FIG. 4, quality score processing algorithm 28 may determine whether the quality score is greater than or equal to predetermined higher threshold value, for example "Y" (step 80) and if so, then dialer application 22 may dial the telephone number (step 90). Value Y may be a numerical value, such as 8, or any other value that can be compared. Otherwise, quality score processing algorithm may determine whether the quality score of the extracted digits is greater than or equal to predetermined lower threshold "X", but less than predetermined higher threshold "Y". Value X may be a numerical value, such as 5, or any other value that can be compared. If not, quality score processing algorithm may indicate that the phone number is unrecognizable (step 84). Otherwise, quality score processing algorithm may compare the extracted digits to stored telephone numbers 24 to generate higher-confidence digits (step 86). As part of this step, the extracted digits may be compared to locally stored telephone numbers, such as telephone numbers stored as part of an address book in memory 16 of handheld device. Alternatively and/or additionally, the extracted digits may be compared to stored telephone numbers at a remote location, such as a remote storage connected via network 10 to handheld device 12. If, as a result of this step, the higher-confidence digits are determined to have a quality score greater than or equal to Y (step 88), then the telephone number may be dialed (step 90). Otherwise, quality score processing algorithm 28 may indicate that the phone number is unrecognizable (step 84).

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for processing a telephone number embedded in a voicemail received by a user of the handheld device, the handheld device comprising a processor and a memory, the method comprising:
    playing back the voicemail;
    in response to receiving a first marker set by the user to indicate a start of a telephone number, initiating storage of an audio sample corresponding to the telephone number in the memory;
    terminating storage of the audio sample corresponding to the telephone number in the memory either automatically or in response to receiving a second marker set by the user to indicate an end of the telephone number;
    using the processor, processing the stored audio sample to extract digits corresponding to the telephone number and communicating the extracted digits to an application executing on the processor; and
    if a quality score corresponding to the extracted digits is within a predetermined range, then comparing the extracted digits to at least one of a set of locally stored telephone numbers and a set of network-stored telephone numbers to generate higher-confidence digits and communicating the higher-confidence digits to an application executing on the processor.

2. The method of claim 1 further comprising determining a quality score corresponding to the extracted digits.

3. The method of claim 1, wherein the first marker is set by the user by pressing a first key and the second is set by the user by pressing a second key.

4. The method of claim 1, wherein the first marker is set by the user by pressing a key and the second is set by the user by releasing the key.

5. The method of claim 1, wherein the voicemail is streamed via a network connected to the handheld device.

6. The method of claim 1 further comprising the handheld device automatically dialing the extracted digits.

7. The method of claim 1 further comprising the handheld device presenting the extracted digits to the user of the handheld device for instructions related to dialing a telephone number based on the extracted digits.

8. A method for processing a telephone number embedded in a voicemail received by a user of the handheld device, the handheld device comprising a processor and a memory, the method comprising:
    playing back the voicemail;
    in response to receiving a first marker set by the user to indicate a start of a telephone number, initiating storage of an audio sample corresponding to the telephone number in the memory;
    terminating storage of the audio sample corresponding to the telephone number in the memory either automatically or in response to receiving a second marker set by the user to indicate an end of the telephone number; and
    using the processor, processing the stored audio sample to extract digits corresponding to the telephone number; determining a quality score corresponding to the extracted digits; if the quality score corresponding to the extracted digits is within a predetermined range, then comparing the extracted digits to at least one of a set of locally stored telephone numbers and a set of network-stored telephone numbers to generate higher-confidence digits and communicating the higher-confidence digits to an application executing on the processor.

9. The method of claim 8, wherein the first marker is set by the user by pressing a key and the second is set by the user by pressing a second key.

10. The method of claim 8, wherein the first marker is set by the user by pressing a key and the second is set by the user by releasing the key.

11. The method of claim 8, wherein the voicemail is streamed via a network connected to the handheld device.

12. The method of claim 8 further comprising the handheld device automatically dialing the extracted digits.

13. The method of claim 8 further comprising the handheld device presenting the extracted digits to the user of the handheld device for instructions related to dialing a telephone number based on the extracted digits.

14. A handheld device comprising:
a memory for storing:
instructions for playing back a voicemail received by the user of the handheld device, and instructions for in response to receiving a first marker set by the user to indicate a start of a telephone number, initiating real-time processing of an audio sample corresponding to the telephone number; and
a processor for processing the audio sample to extract digits corresponding to the telephone number and communicating the extracted digits to an application executing on the processor;
instructions for determining a quality score corresponding to the extracted digits, and
instructions for comparing, if the quality score corresponding to the extracted digits is within a predetermined range, the extracted digits to at least one of a set of locally stored telephone numbers and a set of network-stored telephone numbers to generate higher-confidence digits.

15. The handheld device of claim 14, wherein the first marker is set by the user by pressing a key and the second is set by the user by releasing the key.

16. The method of claim 14, wherein the first marker is set by the user by pressing a key and the second is set by the user by pressing a second key.

17. The handheld device of claim 14 further comprising the memory for storing instructions for either automatically dialing the extracted digits or presenting the extracted digits to the user of the handheld device for instructions related to dialing a telephone number based on the extracted digits.

* * * * *